C. A. BOOTH.
AUTOMATIC ADJUSTING DEVICE FOR BRAKES.
APPLICATION FILED JULY 23, 1913.
1,107,576.
Patented Aug. 18, 1914.
2 SHEETS—SHEET 1.
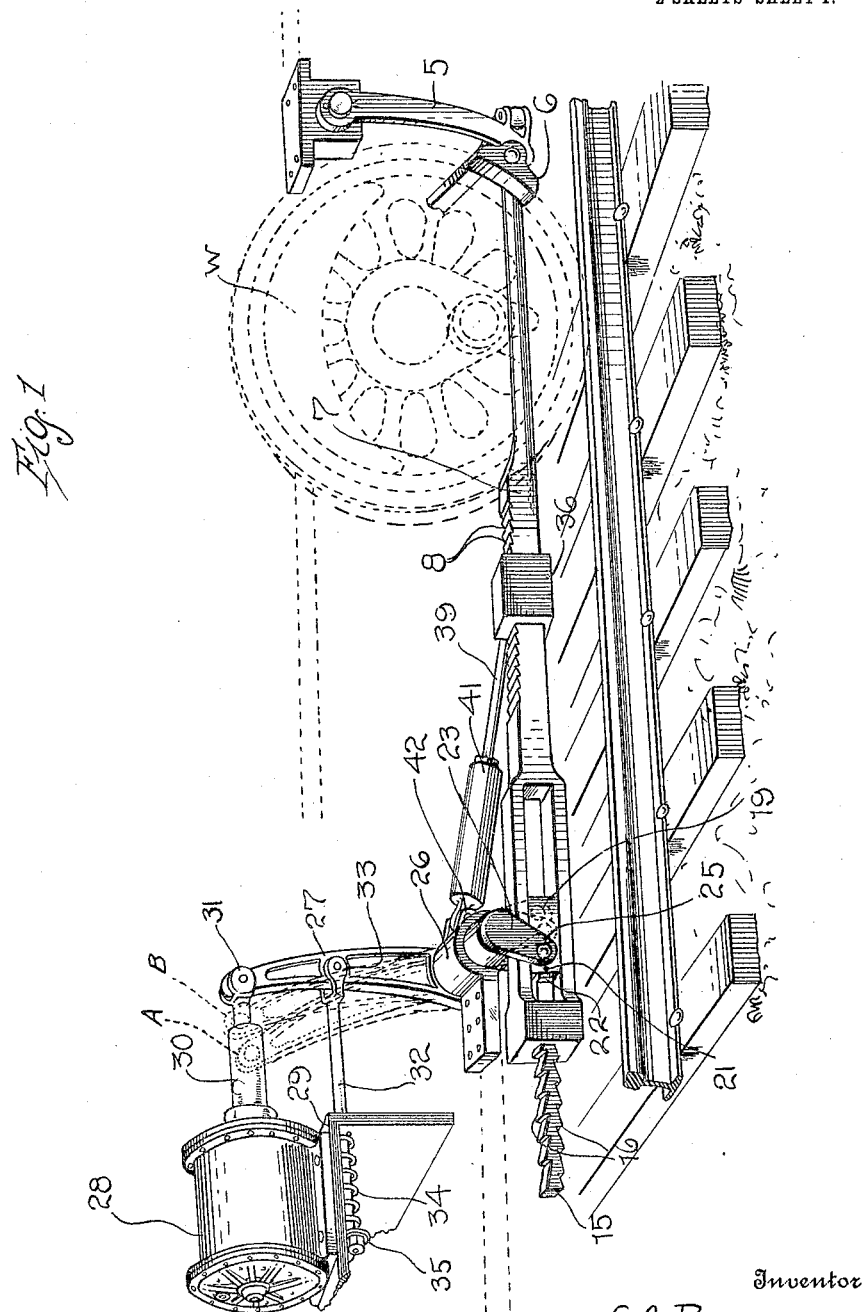
Witnesses
Robert M. Sutphen
A. I. Huid
Inventor
C. A. Booth
By Watson E. Coleman
Attorney C. A. BOOTH.
AUTOMATIC ADJUSTING DEVICE FOR BRAKES.
APPLICATION FILED JULY 23, 1913.
1,107,576.
Patented Aug. 18, 1914.
2 SHEETS—SHEET 2.
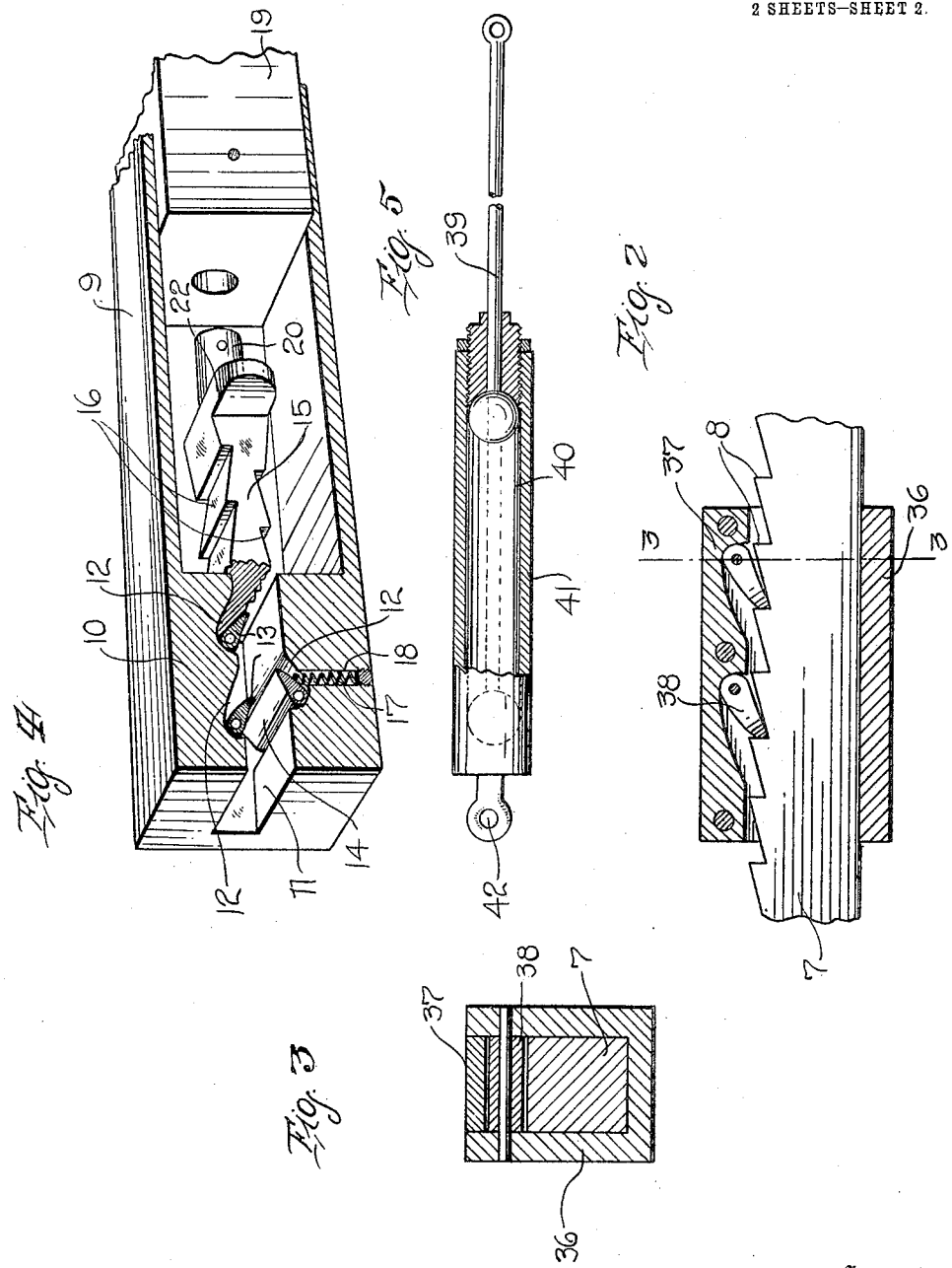
Witnesses
Robert M. Sutphen.
A. I. Hind.
Inventor
C. A. Booth
By Watson E. Coleman
Attorney

UNITED STATES PATENT OFFICE.

CHARLES ALBERT BOOTH, OF BRUNSWICK, MARYLAND, ASSIGNOR OF SEVEN-SIXTEENTHS TO JOHN W. CAVEY, OF BALTIMORE, MARYLAND.

AUTOMATIC ADJUSTING DEVICE FOR BRAKES.

1,107,576.

Specification of Letters Patent. Patented Aug. 18, 1914.

Application filed July 23, 1913. Serial No. 780,760.

*To all whom it may concern:*

Be it known that I, CHARLES A. BOOTH, a citizen of the United States, residing at Brunswick, in the county of Frederick and State of Maryland, have invented certain new and useful Improvements in Automatic Adjusting Devices for Brakes, of which the following is a specification, reference being had to the accompanying drawings.

This invention relates to an improved automatic adjusting device for brakes, and has for its primary object to provide simple, effective and durable means for automatically compensating for the wear upon the brake block and other parts whereby the proper application of the brakes upon each operation thereof is assured.

The invention has for a further object to provide an automatic adjustable connection between the rock shaft which is connected to the piston in the brake cylinder and the brake draw bar, whereby the length of stroke of the piston necessary to properly apply the brakes is reduced to a minimum.

The invention has for still another object the provision of a device of the above character which may be readily applied to the brake mechanism of the driving wheels of a locomotive or the truck wheels of the coaches, and which is at all times highly reliable in operation and not liable to get out of order.

With the above and other objects in view, this invention resides in the novel features of construction, combination and arrangement of parts to be hereinafter more fully described, claimed and illustrated in the accompanying drawings, in which—

Figure 1 is a perspective view illustrating one embodiment of my invention as applied to the application of the brake shoes to the driving wheels of a locomotive; Fig. 2 is a detail longitudinal section; Fig. 3 is a section taken on the line 3—3, Fig. 2. Fig. 4 is a detail sectional perspective view of the draw bar yoke and parts associated therewith; Fig. 5 is a detail section partly in elevation.

Referring in detail to the drawings, and more particularly to Figs. 1 to 5 thereof, 5 designates the hangers mounted in any ordinary or approved manner, and upon the lower ends of which brake blocks 6 are secured for application to the periphery of the driving wheel W of a locomotive. The hangers 5 are of course connected by the usual transversely disposed brake beam.

To the brake beam, one end of the brake bar 7 is suitably connected, and this brake bar is provided with a rectangular portion having a notched or toothed upper edge 8. The bar 7 is provided at its other end with an elongated loop or yoke 9 which terminates in an enlarged block or head 10. If desired, instead of forming this block integral with the loop or yoke, it may consist of a separate cast steel block suitably secured to the parallel straps integrally formed with the brake bar 7, as will be readily understood.

The block 10 is provided with a longitudinal rectangular opening 11, the opposed walls of which are notched or recessed, as at 12. A pair of these notches are provided in the upper wall of said opening while only a single notch is formed in the lower wall thereof. A pair of pawls or dogs 13 are pivotally mounted in the notches 12 in the upper wall of the opening or passage in the block 10, and an additional dog 14 is similarly mounted in the lower notch 12. A rack bar 15 is loosely disposed through the opening 11 and is provided upon its upper and lower faces with notches or teeth 16 which are alternately disposed with relation to each other. The lower pawl or dog 14 is held in engagement with the teeth on the lower face of the rack bar 15 by means of a coil spring 17 which is arranged in a bore 18 provided in the block 10. The upper pair of pawls 13 fall by gravity into engagement with the teeth 16 on the upper face of the rack bar.

A block 19 is longitudinally movable between the parallel straps or arms of the yoke 9. This block is provided in one end with a socket to receive the reduced end 20 of the rack bar 15, and the same is held in said socket by a suitable pin 21. The rack bar at the inner end of the reduced portion 20 thereof has a lateral extension or shoulder 22 integrally formed therewith which abuts against the end face of the block 19. A pair of arms 23 formed upon one end of a rock shaft 24 straddle the yoke 9 and are connected by means of the pin 25 which is loosely mounted in the block 19. The rock shaft 24 is mounted in a suitable bearing 26 secured to the under frame of the locomotive and is provided upon its other end with a single arm 27.

The air brake cylinder 28, which is of any usual or preferred construction, is mounted upon a suitable bed plate 29. 30 designates the rod extending from the piston arranged within said cylinder, and the end of this rod is pivotally connected, as at 31, to the end of the rocker arm 27.

A rod 32 is loosely mounted in the bed plate 29, and is pivotally connected, as at 33 to the arm 27 at a point intermediate of its ends. A coil spring 34 is arranged upon said rod and bears at one of its ends against the bed plate 29. A tension regulating nut 35 is threaded upon the rod 32 whereby the tension of the spring may be adjusted. This spring acts to return the rocker arm 27 to its normal position after the same has been moved and the rock shaft actuated by the movement of the piston in the brake cylinder 28.

A U-shaped plate 36 is loosely arranged upon the brake bar 7, and a bar 37 is arranged between and secured to the parallel portions of this plate above said brake bar. A pair of pawls or dogs 38 are pivotally mounted in the bottom face of this bar 37 and are held by gravity in engagement with the longitudinal series of teeth 8 upon the upper edge of the draw bar. To a lug or jaw on one side of the plate 36, one end of a rod 39 is pivotally connected, the other end of said rod terminating in a ball or sphere 40 which is loosely disposed for longitudinal movement within a cylinder 41. One end of this cylinder is pivotally connected, as at 42, to a bracket plate fixed upon the rock shaft bearing 26. The extent of movement of the end of the rod 39 within the cylinder 41 is equivalent to the shortest stroke of the brake cylinder piston necessary to apply the brakes.

In the operation of the above described form of my invention, when it is desired to apply the brakes, the air is applied to the cylinder 28 in the usual manner, whereupon the piston rod 30 is forced outwardly and the shaft 24 rocked. The rack bar 15 is held in locked engagement with the yoke 9 on the end of the draw bar by means of the pawls 13 and 14 so that in the rocking movement of the shaft 24, the rack bar which is connected to the block 19 is moved together with the brake bar and the brake blocks into braking engagement with the drive wheels of the locomotive. Assuming that the minimum travel of the piston necessary to apply the brakes is five inches, wear upon the brake blocks and other parts will necessitate a further movement of the piston in order to fully apply the brakes. In the five inch travel of the brake applying bar 7, the rod 39 will move in the cylinder 41. In this normal operating stroke of the piston, when the brakes are applied, the arm 27 is in the position illustrated by the dotted lines B in Fig. 1, the terminal 40 of the rod 39 being engaged with the end wall of the cylinder 41. The position of the arm 27 when the brakes are released, is indicated in dotted lines at A in Fig. 1, in which position of the arm, the spherical end of the rod 39 is disposed in the outer end of the cylinder 41. Any further movement of the bar 7, however, in the case above referred to, will be independent of the U-shaped plate 36, said plate being held against movement by engagement of the spherical end 40 of the rod 39 with the inner end of the bore of the cylinder 41. In this excessive movement of the piston, the arm 27 is moved to the position shown in full lines in Fig. 1. The spring 34 after the release of the brake cylinder pressure reverses the movement of the rock shaft 24 and moves the brakes to their release positions.

It will be understood from the construction above described that the release movement of the brake bar is limited by the engagement of the pawls 38 carried by the plate 36 with the rack teeth 8 on the brake bar, the movement of said plate in turn being limited by the spherical end 40 of the rod 39 engaging the outer end of the cylinder 41. Thus the movement of the brake bar when the brakes are released is stopped while the movement of the rack bar 15 through the block 10 is continued in the rocking movement of the shaft 24, the pawls 13 and 14 engaging with the teeth 16 of said rack bar and locking the same in its new position with respect to the brake bar.

From the foregoing, it is thought that the construction and manner of operation of my invention will be clearly and fully understood. The device consists of comparatively few elements which are all of simple form, and it will, therefore, be obvious that the invention can be produced and installed at small cost without necessitating any alterations in the usual train equipment.

It is to be understood that my invention is susceptible of considerable modification in form proportion and arrangements of the detail parts such as may be necessitated by the particular circumstances of its use, and I therefore reserve the right to resort to all such legitimate changes as may be fairly embodied within the spirit and scope of the appended claims.

Having thus described this invention, what is claimed, is:

1. The combination with a brake cylinder piston and a brake bar, of means connecting said bar and piston to apply the brakes when the cylinder pressure is applied, said means including a rock shaft, a block slidably mounted upon the brake bar and connected to said rock shaft, a rack bar connected to said block, pawls mounted upon the brake bar and engaging the teeth of said rack bar to lock the same to the brake bar for movement therewith in one direction, and means movable with said brake bar in the minimum stroke of the brake cylinder piston and adapted to limit the movement of said bar when the brakes are released whereby said rack bar is moved with respect to the brake bar in the rocking movement of said shaft upon an excessive movement of the brake cylinder piston beyond that required in the minimum movement of the brake bar.

2. The combination with a brake cylinder piston and a brake bar, of means connecting said bar and piston to apply the brakes when the cylinder pressure is applied, said means including a rock shaft, a rack bar connected to said rock shaft, pawls carried by the brake bar and engaging the teeth of said rack bar, whereby said brake bar is moved in the rocking movement of the shaft in one direction to apply the brakes, and means movable with said brake bar in the minimum stroke of the brake cylinder piston, said brake bar being movable with respect to said latter means upon an excessive piston stroke, said means including an element mounted to travel a distance equivalent to the minimum stroke of the piston whereby in the reverse movement of the brake bar when the brakes are released, said bar is held against movement and the rack bar moved with respect thereto in the rocking movement of said shaft.

3. The combination with a brake cylinder piston, and a brake bar, of means connecting said bar and piston comprising a rock shaft connected to and actuated by the piston, a rack bar connected to said rock shaft, pawls carried by the brake bar to engage the teeth of said rack bar whereby said brake bar is moved in the rocking movement of the shaft in one direction to apply the brake, a member mounted upon the brake bar and movable therewith, a rod pivotally connected to said member, a cylinder, said rod being movable in the cylinder and having a stroke equivalent to the minimum stroke of the piston necessary to apply the brakes, said brake bar being movable with respect to the member thereon upon excessive movement of the piston, and means for locking said member upon the brake bar whereby, when the brakes are released, said member and brake bar are held against movement while the rack bar is moved with respect to the brake bar in the reverse rocking movement of the shaft.

4. The combination with a brake cylinder and brake bar, of means connecting said bar and piston to apply the brakes when the cylinder pressure is applied, said means comprising a rock shaft connected to the piston, a yoke upon one end of the brake bar, a rack bar movable in said yoke, an arm connected to the rock shaft and to said rack bar to actuate the latter, pawls mounted in the yoke engaging the teeth of the rack bar, said rack bar being provided with teeth upon its upper edge oppositely disposed with relation to the teeth of said rack bar, a U-shaped plate arranged upon the brake bar, a bar connecting the parallel portions of said plate, pawls mounted in said bar and engaging the teeth of the brake bar, a rod connected to said plate, a cylinder in which said rod is movably disposed, the movement of said rod in the cylinder being equivalent to the minimum stroke of the piston necessary to apply the brakes whereby said U-shaped plate is held against movement upon an excessive stroke of the piston when the brakes are applied, and the reverse movement of said bar is limited to the minimum piston stroke when the brakes are released, thereby permitting of the movement of the rack bar with respect to the brake bar in the rocking movement of the shaft.

In testimony whereof I hereunto affix my signature in the presence of two witnesses.

CHARLES ALBERT BOOTH.

Witnesses:
ANTHONY M. CHAMBERS,
MICHAEL CAREY.

---

Copies of this patent may be obtained for five cents each, by addressing the "Commissioner of Patents, Washington, D. C."